(12) United States Patent
Wang et al.

(10) Patent No.: US 10,823,624 B2
(45) Date of Patent: Nov. 3, 2020

(54) MULTIMODE OPTICAL FIBER, APPLICATION THEREOF AND TEMPERATURE-MEASURING SYSTEM

(71) Applicant: YANGTZE OPTICAL FIBRE AND CABLE JOINT STOCK LIMITED COMPANY, Wuhan, Hubei (CN)

(72) Inventors: Zhendong Wang, Hubei (CN); Song Wang, Hubei (CN); Tongqing Liu, Hubei (CN); Chen Yang, Hubei (CN); Xin Mao, Hubei (CN); Weijun Tong, Hubei (CN)

(73) Assignee: YANGTZE OPTICAL FIBRE AND CABLE JOINT STOCK LIMITED COMPANY, Hubei (CN)

( * ) Notice: Subject to any disclaimer, the term of this patent is extended or adjusted under 35 U.S.C. 154(b) by 300 days.

(21) Appl. No.: 15/975,974

(22) Filed: May 10, 2018

(65) Prior Publication Data
US 2019/0003902 A1     Jan. 3, 2019

(30) Foreign Application Priority Data

Jul. 3, 2017    (CN) .......................... 2017 1 0534733

(51) Int. Cl.
    *G01J 5/00*         (2006.01)
    *G01K 11/32*      (2006.01)
    (Continued)

(52) U.S. Cl.
    CPC ............ *G01K 11/32* (2013.01); *G02B 6/0281* (2013.01); *G02B 6/0288* (2013.01); *G01J 3/0218* (2013.01); *G01K 2011/324* (2013.01)

(58) Field of Classification Search
    CPC ............ G02B 6/02304; G02B 6/12007; G02B 6/021; G02B 6/023; G02B 6/03694;
    (Continued)

(56) References Cited

U.S. PATENT DOCUMENTS

| | | | | |
|---|---|---|---|---|
| 4,756,627 A | * | 7/1988 | Nelson | G01K 5/52 374/159 |
| 5,318,432 A | * | 6/1994 | Yagi | B30B 11/245 425/466 |
| 9,297,953 B2 | * | 3/2016 | Wang | G02B 6/03644 |
| 2008/0089636 A1 | * | 4/2008 | MacDougall | G01K 11/3206 385/12 |

(Continued)

FOREIGN PATENT DOCUMENTS

CN        102539015 A      7/2012
CN        203350478 U   *   12/2013

*Primary Examiner* — Gail Kaplan Verbitsky
(74) *Attorney, Agent, or Firm* — Tim Tingkang Xia, Esq.; Locke Lord LLP

(57) ABSTRACT

A multimode optical fiber includes a core and a cladding covering the core. The core has a radius in a range of 23.75-26.25 μm. A refractive index profile of the core has a graded refractive index distribution with a refractive index distribution index α in a range of 1.80-1.89. The core has a maximum relative refractive index difference Δ1% in a range from 1.0% to 1.15%. The multimode optical fiber has a fusion loss less than or equal to 0.08 dB. The multimode optical fiber is applied in a middle-and-long distance distributed temperature-measuring system, and a temperature-measuring distance of the system reaches 10 km to 27 km. The system includes a pulsed laser light source, a wavelength division multiplexer, an avalanche photodiode, a data acquisition device, an upper computer, and the temperature-measuring multimode optical fiber.

8 Claims, 3 Drawing Sheets

(51) Int. Cl.
*G02B 6/028* (2006.01)
*G01J 3/02* (2006.01)

(58) Field of Classification Search
CPC .... G02B 6/0286; G02B 6/03605; G02B 6/2813;
G02B 6/4415; G02B 6/0288; G02B 6/02;
G02B 6/0281; G02B 6/02057; G02B
6/2938; G02B 6/34; A61B 2018/2244;
G01K 13/00; G01K 11/32; G01K
11/3206; G01K 2011/324; G01N
2021/6484; G01N 2021/7783; G01N
15/0205; G01J 3/0218; G01J 5/0014;
G01J 5/08; G01J 5/0821
USPC ............... 374/120, 121, 130, 131, 137, 124;
385/12, 126, 124, 127, 123
See application file for complete search history.

(56) References Cited

U.S. PATENT DOCUMENTS

| | | | | |
|---|---|---|---|---|
| 2009/0304322 A1* | 12/2009 | Davies | .............. | G01H 9/004 |
| | | | | 385/12 |
| 2010/0166362 A1* | 7/2010 | Fujii | .............. | G02B 6/4214 |
| | | | | 385/14 |
| 2015/0092818 A1* | 4/2015 | Hill | .............. | G01K 11/32 |
| | | | | 374/161 |
| 2015/0117827 A1* | 4/2015 | Wang | .............. | G02B 6/03644 |
| | | | | 385/124 |
| 2017/0215736 A1* | 8/2017 | Hu | .............. | A61B 5/725 |
| 2018/0335562 A1* | 11/2018 | Yu | .............. | G02B 6/028 |
| 2018/0375279 A1* | 12/2018 | Kajiwara | .............. | G02B 6/02 |
| 2020/0018895 A1* | 1/2020 | Zheng | .............. | G02B 6/03644 |

\* cited by examiner

MULTIMODE OPTICAL FIBER, APPLICATION THEREOF AND TEMPERATURE-MEASURING SYSTEM

CROSS-REFERENCE TO RELATED APPLICATION

This application claims priority to Chinese Patent Application No. 201710534733.7, filed Jul. 3, 2017 in the State Intellectual Property Office of P.R. China, which is hereby incorporated herein in its entirety by reference.

FIELD OF THE INVENTION

The present disclosure relates to the technical field of temperature-measuring multimode optical fiber, and in particular, to a multimode optical fiber, application thereof and a temperature-measuring system.

BACKGROUND OF THE INVENTION

Temperature measurement and control plays a very important role in fields of aerospace, materials, energy, metallurgy, etc. Distributed optical fiber temperature measurement is an emerging contact temperature measurement technology. In the distributed optical fiber temperature measurement technology, optical fibers are used as carriers for temperature information sensing and signal transmission, and it has features of continuous temperature measurement, distributed temperature measurement, real-time temperature measurement, anti-electromagnetic interference, intrinsic safety, remote monitoring, high sensitivity, easy installation and long service life, and is widely used in industries like pipelines, tunnels, cables, the petroleum and petrochemical industry, and coal mines.

A distributed optical fiber temperature-measuring system integrates the Raman scattering principle and the Optical Time Domain Reflectometry Technique. Anti-Stokes light in spontaneous Raman back scattering carrying temperature information in an optical fiber is collected as a signal channel. At the same time, Stokes light or Rayleigh scattering light is collected as a contrast channel. After photoelectric conversion and analog-to-digital conversion, a temperature field distribution along the optical fiber is recovered through data processing. Key performance parameters of the distributed optical fiber temperature-measuring system include temperature resolution, spatial resolution, temperature-measuring length, single measuring time and so on. The spatial resolution is an important indicator in a distributed optical fiber temperature-measuring system, and it refers to a minimum temperature-sensing length of an optical fiber in a temperature-measuring system. Specifically, it can be expressed as, when a certain section of a temperature-measuring optical fiber is undergoing a step change of temperature, a corresponding response distance when a temperature response curve of the temperature-measuring optical fiber rises from 10% to 90%.

In an existing distributed optical fiber temperature-measuring system, a multimode optical fiber for communication is generally used as a sensing optical fiber. A multimode optical fiber has a large mode field area and a high Raman gain coefficient, and it is easy to obtain temperature information along the optical fiber by spontaneous Raman scattering. However, a disadvantage of the multimode optical fiber for communication lies in large optical fiber loss. In order to achieve a higher spatial resolution, it is often preferable to select an operation wavelength with better conductivity and to optimize parameters of a multimode optical fiber regarding the operation wavelength, such as the sensing optical fiber mentioned in Chinese patent CN102539015A.

However, more importantly, widening of pulse width of pulsed light sources introduced due to intermodal dispersion (mode-differential group delay) of multimode optical fibers results in an insufficient spatial resolution for longer-distance sensing. This actually limits a sensing distance of optical fibers in a temperature-measuring scene that requires a high spatial resolution, which results in an insufficient temperature-measuring length.

SUMMARY OF THE INVENTION

With respect to the above defects or improvement requirements in the prior art, the present disclosure provides a temperature-measuring multimode optical fiber, application thereof and a temperature-measuring system. The objective of the present disclosure is to realize a significant decrease in optical attenuation of anti-Stokes Raman scattering light (1450 nm) and Stokes Raman scattering light (1660 nm) within an operation waveband by selection of optical fiber parameters, so as to solve the technical problems of limited sensing distance and insufficient temperature-measuring length in distributed temperature-measuring fibers of the prior art.

In order to achieve the above objective, according to one aspect of the present disclosure, a temperature-measuring multimode optical fiber is provided. The temperature-measuring multimode optical fiber comprises a core and a cladding covering the core. The core has a radius in a range from 23.75 µm to 26.25 µm. A refractive index profile of the core has a graded refractive index distribution with a refractive index distribution index $\alpha$ in a range from 1.80 to 1.89. The core has a maximum relative refractive index difference $\Delta 1\%$ in a range from 1.0% to 1.15%. The temperature-measuring multimode optical fiber has a fusion loss less than or equal to 0.08 dB.

Preferably, the temperature-measuring multimode optical fiber has a numerical aperture in a range from 0.190 to 0.205.

Preferably, the core of the temperature-measuring multimode optical fiber is made of $SiO_2$ quartz glass of a germanium-fluorine co-doped system.

Preferably, the cladding of the temperature-measuring multimode optical fiber is made of high-purity quartz glass.

Preferably, the cladding of the temperature-measuring multimode optical fiber has a radius in a range from 62.0 µm to 63.0 µm.

Preferably, the core of the temperature-measuring multimode optical fiber has a radius in a range from 24.5 µm to 25.5 µm and a refractive index distribution index $\alpha$ in a range from 1.84 to 1.86, and the temperature-measuring multimode optical fiber has a numerical aperture in a range from 0.195 to 0.200.

Preferably, the cladding of the temperature-measuring multimode optical fiber is coated with a high polymer material, and the high polymer material is preferably acrylic resin or heat resisting polyimide coating. When the high polymer material is acrylic resin, the temperature-measuring multimode optical fiber has an outer diameter of 245±10 µm. When the high polymer material is heat resisting polyimide coating, the temperature-measuring multimode optical fiber has an outer diameter of 160±10 µm.

According to another aspect of the present disclosure, application of the temperature-measuring multimode optical fiber according to present disclosure in a middle-and-long distance distributed temperature-measuring system is provided. A temperature-measuring distance of the system reaches 27 km.

According to further another aspect of the present disclosure, a distributed temperature-measuring system is provided. The distributed temperature-measuring system comprises a pulsed laser light source, a wavelength division multiplexer (WDM), an avalanche photodiode (APD), a data acquisition device, an upper computer, and the temperature-measuring multimode optical fiber provided in the present disclosure. Laser light emitted from the pulsed laser light source is connected to the temperature-measuring multimode optical fiber via the WDM. The WDM is configured to receive a signal from the temperature-measuring multimode optical fiber, and is connected to the APD for transmitting an optical signal of 1450 nm and an optical signal of 1660 nm. The APD is configured to convert an optical signal into a current signal, and is connected to the data acquisition device for transmitting the optical signal of 1450 nm and the optical signal of 1660 nm. The data acquisition device is connected to the upper computer. The upper computer receives data acquired by the acquisition device.

Preferably, a pulsed light source of 1550 nm is used as the pulsed laser light source of the distributed temperature-measuring system.

The temperature-measuring multimode optical fiber has a longest temperature-measuring distance reaching 27 km and a fusion loss at a fusion point less than 0.08 dB. Hence, the number of temperature jumps due to the fusion point can be reduced, and false alarm of the temperature-measuring system can be avoided.

In general, the above technical solution provided in the present disclosure has achieved following beneficial effects over the prior art.

(1) Compared with conventional multimode optical fibers for communication, the multimode optical fiber provided by the present disclosure simultaneously optimizes the bandwidth at 1550 nm and the loss at 1450 nm, increases the spatial resolution of the temperature-measuring system, and improves the temperature measurement precision and temperature-measuring distance, so that the multimode optical fiber provided by the present disclosure can be applied to middle-and-long distance temperature-measuring systems and the temperature-measuring distance can reach 10 km to 27 km.

In a preferred solution, a radius and a numerical aperture of a core are optimized, so that a fusion loss of the optical fiber is lower and a long-distance optical transmission effect is ensured.

(2) The temperature-measuring system provided by the present disclosure has a simple structure. Since the fusion loss of the optical fiber is low and the bandwidth is high, noise is low, a signal-to-noise ratio is high, and a temperature measurement result is accurate.

DETAILED DESCRIPTION OF THE EMBODIMENTS

The present disclosure will be further explained in detail hereinafter with reference to the accompanying drawings and embodiments in order to make the objective, technical solutions, and advantages of the present disclosure clearer and more comprehensible. It should be understood that the specific embodiments described herein are only used to explain the present disclosure and are not used to limit the present disclosure. In addition, the technical features involved in the various embodiments of the present disclosure described below can be combined with each other as long as they do not constitute a conflict with each other.

Figure 1:
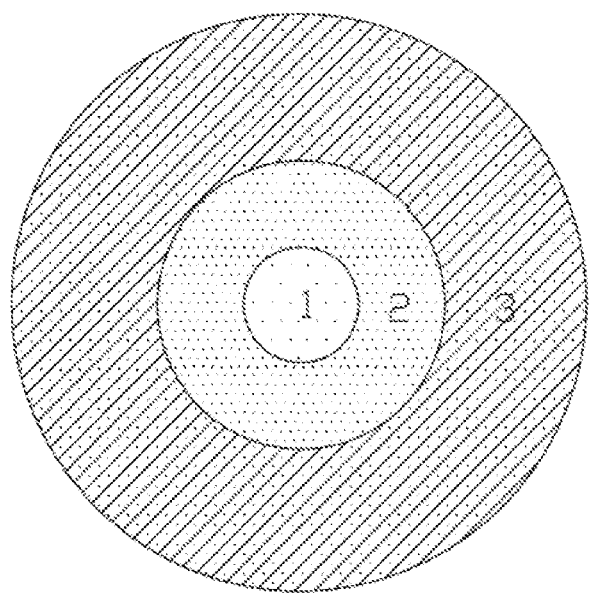
FIG. 1 schematically shows a structure of a temperature-measuring multimode optical fiber provided by the present disclosure.
Figure 2:
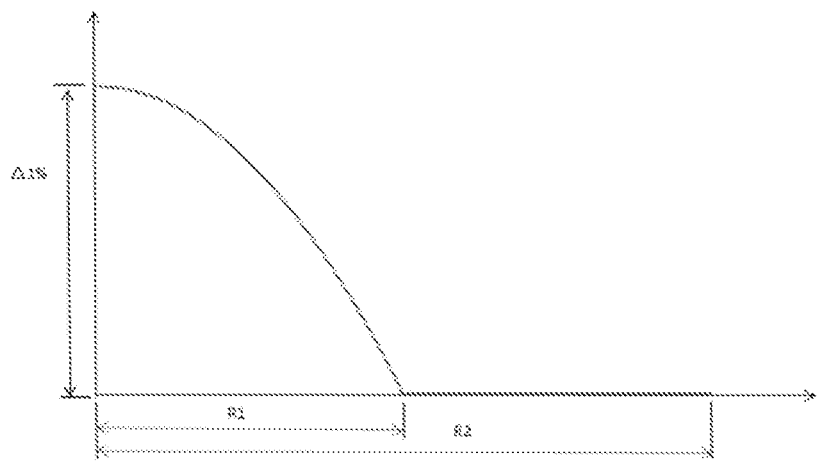
FIG. 2 schematically shows a refractive index profile of the temperature-measuring multimode optical fiber provided by the present disclosure.

The temperature-measuring multimode optical fiber provided in the present disclosure, as shown in FIG. 1, comprises a core, a cladding covering the core, and a high polymer material coated on a surface of the cladding. The core has a radius in a range from 23.75 μm to 26.25 μm, preferably from 24.5 μm to 25.5 μm. A refractive index profile of the core has a graded refractive index distribution with a refractive index distribution index α in a range from 1.80 to 1.89, preferably from 1.84 to 1.86. The core has a relative refractive index difference Δ1% in a range from 1.0% to 1.15%, as shown in FIG. 2. The temperature-measuring multimode optical fiber has a fusion loss less than or equal to 0.08 dB. The core is preferably made of $SiO_2$ quartz glass of a germanium-fluorine co-doped system.

The cladding has a radius in a range from 62.0 μm to 63.0 μm, preferably from 62.1 μm to 62.7 μm, and is preferably made of high-purity quartz glass.

The high polymer material is preferably acrylic resin or heat resisting polyimide coating. When the high polymer material is acrylic resin, the temperature-measuring multimode optical fiber has an outer diameter of 245±10 μm. When the high polymer material is heat resisting polyimide coating, the temperature-measuring multimode optical fiber has an outer diameter of 160±10 μm.

The multimode optical fiber has a numerical aperture in a range from 0.190 to 0.205, preferably from 0.195 to 0.200 and a fusion loss less than or equal to 0.08 dB. In this case, the number of temperature jumps due to a fusion point can be reduced, and false alarm of the temperature-measuring system can be avoided. Especially in a long distance transmission, the fusion loss has a greater influence on a temperature-measuring effect.

The multimode optical fiber provided by the present disclosure has an effective mode bandwidth of more than 500 MHz*km at 1550 nm, an optimal bandwidth of more than 1000 MHz*km, and an attenuation less than 0.5 dB/km at 1450 nm.

Figure 3:
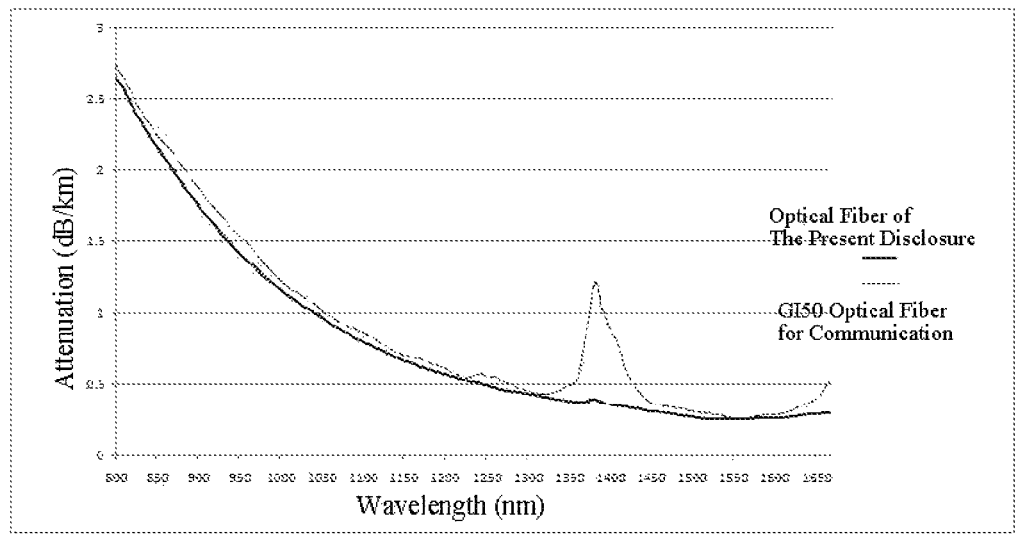
FIG. 3 shows a fiber attenuation curve by wavelength of the temperature-measuring multimode optical fiber provided by the present disclosure.

A multimode optical fiber has a large mode field area and a high Raman gain coefficient, and it is easy to obtain temperature information along the optical fiber by spontaneous Raman scattering. A light source of 1550 nm is used as exciting light in a typical distributed temperature-measuring system. Anti-Stokes Raman scattering light (1450 nm) corresponding to such light source serves as a temperature-measuring signal channel, and Stokes Raman scattering light (1660 nm) serves as a temperature-measuring reference channel. The present disclosure breaks through the previous thinking of optical fiber design regarding detecting laser light and optimizes transmission attenuation of Stokes Raman scattering light and that of anti-Stokes Raman scattered light regarding the temperature-measuring system. Through a large number of experiments, parameters of the core of the multimode optical fiber were obtained and tested in various combinations. The temperature-measuring multimode optical fiber provided by the present disclosure was obtained at last, and has a decrease of optical attenuation within C-band neighboring the waveband of the Stokes Raman scattering light and the waveband of the anti-Stokes Raman scattering light. As shown in FIG. 3, it is well known in the art that a multimode optical fiber for communication will have an optical attenuation increase peak at a waveband of 1385 nm, resulting in an increase of optical attenuation of anti-Stokes Raman scattering light and optical attenuation of Stokes Raman scattering light. Optical attenuation of the optical fiber provided by the present disclosure fluctuates smoothly at the waveband of 1385 nm, the influence of which on wavebands of the anti-Stokes Raman scattering light and the Stokes Raman scattering light is almost negligible.

Figure 5:
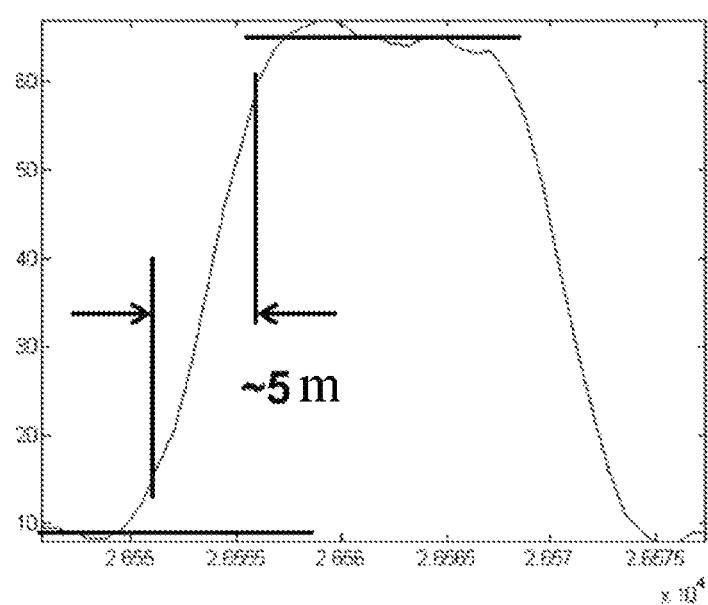
FIG. 5 is a diagram showing a test result of spatial resolution of a distributed temperature-measuring system provided in Embodiment 8 of the present disclosure.

At the same time, the optical fiber provided by the present disclosure also has an excellent performance in terms of fusion loss. In general, the temperature-measuring multimode optical fiber provided by the present disclosure can be applied to a middle-and-long distance distributed temperature-measuring system. A spatial resolution of the system reaches 5 m, a temperature resolution thereof is less than 2° C., and a temperature-measuring distance thereof reaches 27 km. Hence, a temperature-measuring distance of the temperature-measuring optical fiber in the prior art is broken through, and high-resolution temperature measurement in a middle-and-long distance is realized, as shown in FIG. 5.

The temperature-measuring multimode optical fiber provided by the present disclosure can be prepared by a PCVD (Plasma Chemical Vapor Deposition) in-pipe method.

The present disclosure provides a temperature-measuring multimode optical fiber and a middle-and-long distance distributed temperature-measuring system. A temperature-measuring distance of the system reaches 27 km.

Figure 4:
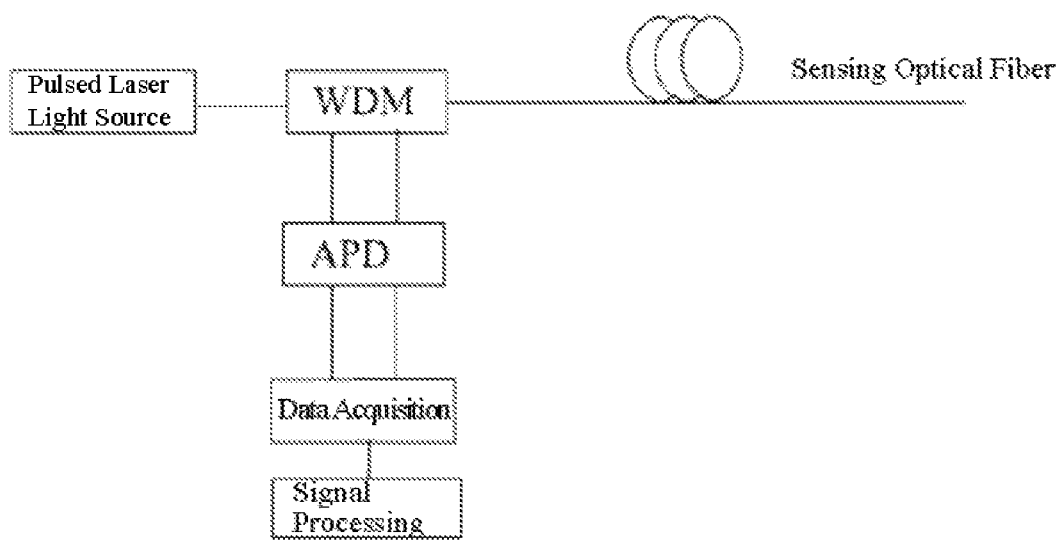
FIG. 4 schematically shows a structure of a distributed temperature-measuring system.

The distributed temperature-measuring system provided by the present disclosure, as shown in FIG. 4, comprises a pulsed laser light source, a wavelength division multiplexer (WDM), an avalanche photodiode (APD), a data acquisition device, an upper computer, and the temperature-measuring multimode optical fiber provided by the present disclosure.

Laser light emitted from the pulsed laser light source is connected to the temperature-measuring multimode optical fiber via the WDM. The pulsed laser light source is a pulsed light source of 1550 nm.

The temperature-measuring multimode optical fiber has a longest temperature-measuring distance reaching 27 km and a fusion loss at a fusion point less than 0.08 dB. Hence, the number of temperature jumps due to the fusion point can be reduced, and false alarm of the temperature-measuring system can be avoided.

The upper computer receives data acquired by the acquisition device. The WDM is configured to receive a signal from the temperature-measuring multimode optical fiber, and is connected to the APD for transmitting an optical signal of 1450 nm and an optical signal of 1660 nm. The APD is configured to convert an optical signal into a current signal, and is connected to the data acquisition device for transmitting the optical signal of 1450 nm and the optical signal of 1660 nm. The data acquisition device is connected to the upper computer. The upper computer receives data acquired by the acquisition device.

Embodiments are as follows.

Embodiments 1 to 4 relate to a temperature-measuring multimode optical fiber.

According to the above solution design, a group of optical fibers are prepared. A core of the group of optical fibers is made of $SiO_2$ quartz glass of a germanium-fluorine co-doped system, and a cladding thereof is made of high-purity quartz glass. Relevant parameters are shown in Table 1.

TABLE 1

|  | 1 | 2 | 3 | 4 |
|---|---|---|---|---|
| Refractive Index Distribution Index α | 1.92 | 1.86 | 1.89 | 1.85 |
| Δ1% | 1.102 | 1.03 | 1.15 | 1.10 |
| R1 (μm) | 24.81 | 25.01 | 24.9 | 24.77 |
| R2 (μm) | 62.3 | 62.2 | 62.7 | 62.1 |
| Numerical Aperture | 0.193 | 0.194 | 0.204 | 0.196 |
| Bandwidth @1550 nm (MHz*km) | 351 | 1193 | 573 | 1252 |
| Attenuation @1300 nm (dB/km) | 0.43 | 0.43 | 0.45 | 0.44 |
| Attenuation @1450 nm (dB/km) | 0.334 | 0.371 | 0.362 | 0.377 |
| Attenuation @1550 nm (dB/km) | 0.25 | 0.25 | 0.25 | 0.26 |

The multimode optical fiber in Embodiments 1 to 4 is applied in a distributed temperature-measuring system in Embodiments 5 to 8, results of which are as follows.

The distributed temperature-measuring system comprises a pulsed laser light source, a wavelength division multiplexer (WDM), an avalanche photodiode (APD), a data acquisition device, an upper computer, and the temperature-measuring multimode optical fiber provided by the present disclosure.

Laser light emitted from the pulsed laser light source is connected to the temperature-measuring multimode optical fiber via the WDM. The pulsed laser light source is a pulsed light source of 1550 nm.

The temperature-measuring multimode optical fiber has a temperature-measuring distance reaching 10 km to 27 km and a fusion loss at a fusion point less than 0.08 dB. Hence, the number of temperature jumps due to the fusion point can be reduced, and false alarm of the temperature-measuring system can be avoided.

The WDM is configured to receive a signal from the temperature-measuring multimode optical fiber, and is connected to the APD for transmitting an optical signal of 1450 nm and an optical signal of 1660 nm. The APD is configured to convert an optical signal into a current signal, and is connected to the data acquisition device for transmitting the optical signal of 1450 nm and the optical signal of 1660 nm. The data acquisition device is connected to the upper computer. The upper computer receives data acquired by the acquisition device.

Parameters are shown in Table 2.

TABLE 2

|  | Embodiment 5 | Embodiment 6 | Embodiment 7 | Embodiment 8 |
|---|---|---|---|---|
| Optical Fiber Length | 10 km | 15 km | 20 km | 27 km |
| Spatial Resolution | 7 m | 6 m | 8 m | 5 m |

TABLE 2-continued

|  | Embodiment 5 | Embodiment 6 | Embodiment 7 | Embodiment 8 |
|---|---|---|---|---|
| Temperature Resolution | 4° C. | 5° C. | 4° C. | 2° C. |

Those skilled in the art can easily understand that the above descriptions are only the preferred embodiments of the present disclosure and are not intended to limit the present disclosure. Any amendment, equivalent replacement and improvement made within the spirit and principle of the present disclosure should be included in the protection scope of the present disclosure.

What is claimed is:

1. A distributed temperature-measuring system, comprising a pulsed laser light source, a wavelength division multiplexer, an avalanche photodiode, a data acquisition device, an upper computer, and a temperature-measuring multimode optical fiber,
wherein temperature-measuring multimode optical fiber comprises a core and a cladding covering the core, wherein the core has a radius in a range from 23.75 μm to 26.25 μm; a refractive index profile of the core has a graded refractive index distribution with a refractive index distribution index a in a range from 1.80 to 1.89; and the core has a maximum relative refractive index difference Δ1% in a range from 1.0% to 1.15%, and the temperature-measuring multimode optical fiber having a fusion loss less than or equal to 0.08 dB;
wherein laser light emitted from the pulsed laser light source is connected to the temperature-measuring multimode optical fiber via the wavelength division multiplexer;
wherein the wavelength division multiplexer is configured to receive a signal from the temperature-measuring multimode optical fiber, and is connected to the avalanche photodiode (APD) for transmitting an optical signal of 1450 nm and an optical signal of 1660 nm;
wherein the avalanche photodiode is configured to convert an optical signal into a current signal, and is connected to the data acquisition device for transmitting the optical signal of 1450 nm and the optical signal of 1660 nm;
wherein the data acquisition device is connected to the upper computer; and
wherein the upper computer receives data acquired by the data acquisition device.

2. The distributed temperature-measuring system according to claim 1, wherein the temperature-measuring multimode optical fiber has a numerical aperture in a range from 0.190 to 0.205.

3. The distributed temperature-measuring system according to claim 1, wherein the core is made of $SiO_2$ quartz glass of a germanium-fluorine co-doped system.

4. The distributed temperature-measuring system according to claim 1, wherein the cladding is made of high-purity quartz glass.

5. The distributed temperature-measuring system according to claim 1, wherein the cladding has a radius in a range from 62.0 μm to 63.0 μm.

6. The distributed temperature-measuring system fiber-according to claim 1, wherein the core has a radius in a range from 24.5 μm to 25.5 μm and a refractive index distribution index μ in a range from 1.84 to 1.86, and the temperature-measuring multimode optical fiber having a numerical aperture in a range from 0.195 to 0.200.

7. The distributed temperature-measuring system according to claim 1, wherein the cladding is coated with a high polymer material, and the high polymer material is preferably acrylic resin or heat resisting polyimide coating,
wherein when the high polymer material is acrylic resin, the temperature-measuring multimode optical fiber has an outer diameter of 245±10 μm; and
wherein when the high polymer material is heat resisting polyimide coating, the temperature-measuring multimode optical fiber has an outer diameter of 160±10 μm.

8. The distributed temperature-measuring system according to claim 1, wherein a pulsed light source of 1550 nm is used as the pulsed laser light source, and
wherein a fusion loss at a fusion point of the temperature-measuring multimode optical fiber is less than 0.08 dB.

* * * * *